United States Patent [19]

Kopp et al.

[11] Patent Number: 4,943,911
[45] Date of Patent: Jul. 24, 1990

[54] SYSTEM FOR LOADING INITIAL PROGRAM LOADER ROUTINE INTO SECONDARY COMPUTER WITHOUT BOOTSTRAP ROM

[75] Inventors: Dieter Kopp, Hemmingen; Thomas Hörmann, Grossbottwar-WZH; Uwe Ackermann, Freiberg, all of Fed. Rep. of Germany

[73] Assignee: Alcatel N.V., Amsterdam, Netherlands

[21] Appl. No.: 123,390

[22] Filed: Nov. 20, 1987

[30] Foreign Application Priority Data

Nov. 20, 1986 [DE] Fed. Rep. of Germany ....... 3639571

[51] Int. Cl.⁵ ............,............ G06F 9/24; G06F 9/30; G06F 13/14
[52] U.S. Cl. .................... 364/200; 364/228.1; 364/228.3; 364/229; 364/242.3; 364/243.2; 364/244.6; 364/244.8; 364/263.3
[58] Field of Search ... 364/200 MS File, 900 MS File, 364/300

[56] References Cited

U.S. PATENT DOCUMENTS

| | | | |
|---|---|---|---|
| 4,237,533 | 12/1980 | Mills et al. | 364/200 |
| 4,459,664 | 7/1984 | Pottier et al. | 364/200 |
| 4,491,914 | 1/1985 | Sujaku | 364/200 |
| 4,530,051 | 7/1985 | Johnson et al. | 364/200 |
| 4,539,637 | 9/1985 | Debruler | 364/200 |
| 4,543,627 | 9/1985 | Schwab | 364/200 |
| 4,590,556 | 5/1986 | Berger et al. | 364/200 |
| 4,720,812 | 1/1988 | Kao et al. | 364/900 |

Primary Examiner—David Y. Eng
Assistant Examiner—Ayni Mohammed
Attorney, Agent, or Firm—Christie, Parker & Hale

[57] ABSTRACT

A secondary computer is connected to a primary computer via a shared memory. The initial program loader for the secondary computer is stored in a mass memory of the primary computer rather than in a bootstrap memory. The primary computer loads the initial program loader into the shared memory, sends a restart instruction to a central processing unit of the secondary computer, and then controls a memory access logic circuit such that all program memory access instruction are routed to that portion of the shared memory holding the initial program loader until the secondary computer has read out the last instruction of the initial program loader. The central processing unit then sends to the memory access logic circuit an acknowledge signal which causes the latter to route all further program memory access instructions to a program memory of the secondary computer.

1 Claim, 2 Drawing Sheets

SYSTEM FOR LOADING INITIAL PROGRAM LOADER ROUTINE INTO SECONDARY COMPUTER WITHOUT BOOTSTRAP ROM

TECHNICAL FIELD

The present invention relates to method and apparatus for loading an initial program loader and more particularly for so loading a secondary computer which is connected to a primary computer via a shared random-access memory.

BACKGROUND ART

A primary/secondary computer system typically contains a mass-storage memory in which programs for the secondary computer are stored. When needed, these programs are first loaded by the primary computer into a shared memory, e.g., a dual-port memory, and then transferred into a program memory of the secondary computer for further processing.

However, in such a system, it has been necessary that an initial program load process must first be initiated in the secondary computer to place it into a state of initial readiness. To this end, the secondary computer typically includes a bootstrap ROM in which an initial program loader routine is permanently stored. Such bootstrap ROMs are expensive, inflexible, and, especially if the secondary computer is to be fabricated on a single monolithic wafer using large scale integration techniques, are infrequently used and wasteful of the limited available wafer area.

DISCLOSURE OF INVENTION

Accordingly, the technical problem to be solved by the present invention is to load an initial program loader, routine into a secondary computer without the need for an associated bootstrap ROM.

In accordance with the method aspects of the invention, the initial program loader for the secondary computer is stored in a mass memory of the primary computer rather than in a bootstrap memory of the secondary computer. The primary computer loads the initial program loader into the shared memory, sends a restart instruction to a central processing unit of the secondary computer, and then controls a memory access logic circuit of the secondary computer such that all program memory access instructions are routed to that portion of the shared memory holding the initial program loader until the secondary computer has read out (and executed) all of the initial program loader. An ACKNOWLEDGE signal is then sent to the memory access logic circuit which causes the latter to route all further program memory access instructions to a program memory of the secondary computer.

In a preferred embodiment, the memory access logic circuit consists of a flip-flop, a first OR gate, and a second OR gate; the primary computer is connected via the control line to a first input of the flip-flop, the central processing unit of the secondary computer is connected via the ACKNOWLEDGEMENT line to a second input of the flip-flop; a noninverting output and an inverting output of the flip-flop are connected to a first input of the first OR gate and to a first input of the second OR gate, respectively; the central processing unit is connected via the control bus to a second input of the second OR gate; an output of the first OR gate is connected via the control bus to the program memory of the secondary computer; and an output of the second OR gate is connected to the common memory.

A principal advantage offered by the invention is that the normally required bootstrap ROM is eliminated, because the initial program loader is simply stored in the mass memory of the primary computer. Moreover, it is now possible to change the initial program loader routine at any time, since it is no longer fixed in a read-only memory.

BRIEF DESCRIPTION OF DRAWINGS

An embodiment of the invention will now be explained in detail with reference to the accompanying drawings, in which.

BEST MODE FOR CARRYING OUT THE INVENTION

To facilitate the explanation of the method aspects of the invention, a preferred embodiment of a circuit arrangement for carrying out such a method will first be described.

Figure 1:
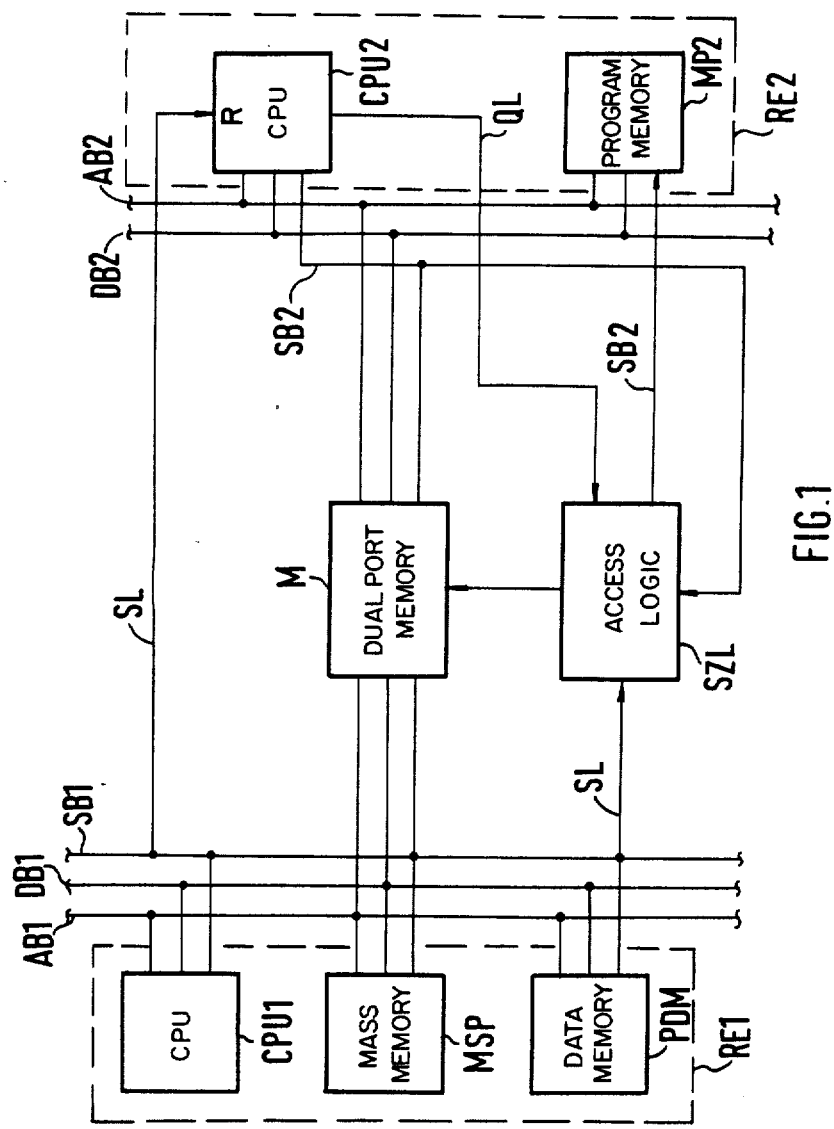
FIG. 1 is a block diagram of the circuit arrangement in accordance with the invention.

As shown in FIG. 1, a primary computer RE1 contains a central processing unit CPU1, a mass storage memory MSP, and a program and data memory PDM, which are connected together and to a shared memory M by an address bus AB1, a data bus DB1, and a control bus SB1. The shared memory M may be a dual-port memory.

A secondary computer RE2 essentially consists of a central processing unit CPU2 and a program memory MP2, which are connected together and to the shared memory M by a second data bus DB2, a second address bus AB2, and a second control bus SB2.

The primary computer RE1 is connected via a control line SL (which in the illustrated example is also part of the control bus SB1 of the primary computer RE1) to the central processing unit CPU2 (e.g., via a reset input R) of the secondary computer RE2 and to a memory access logic circuit SZL. The memory access logic circuit SZL (which will be described in more detail below) is coupled to the shared memory M and connected into the second control bus SB2 of the secondary computer RE2 between its central processing unit CPU2 and its program memory MP2. The central processing unit CPU2 of the secondary computer RE2 is also connected to the memory access logic circuit SZL by an acknowledgement line QL.

Figure 2:
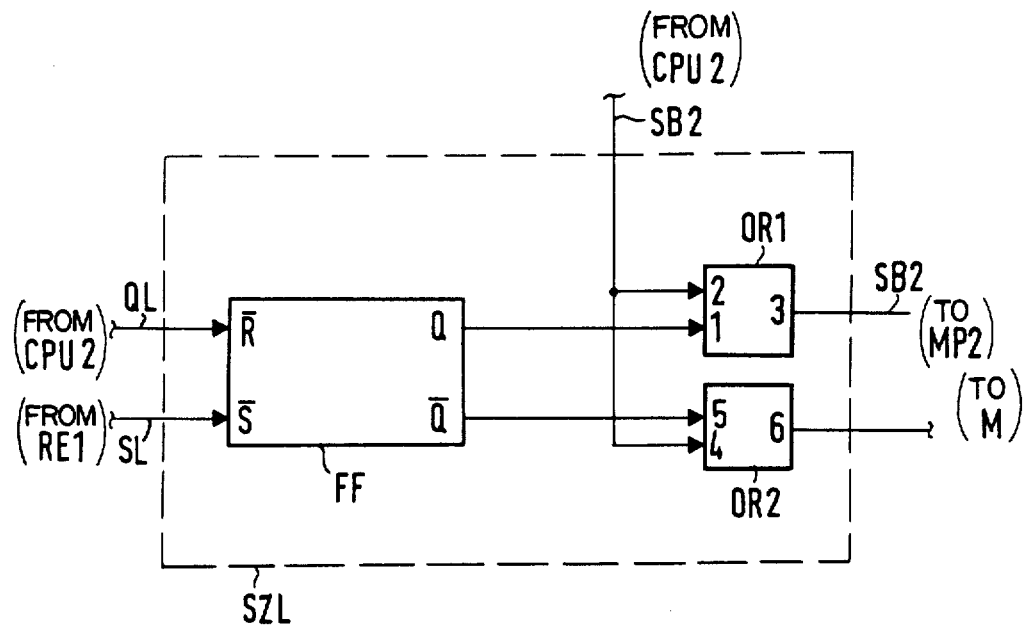
FIG. 2 is a circuit diagram of the memory access logic circuit of the circuit arrangement of FIG. 1.

Referring now to FIG. 2, it will be seen that a preferred embodiment of the memory access logic circuit SZL consists of a flip-flop FF (here an RS flip-flop), a first OR gate OR1, and a second OR gate OR2. The control bus SB1 of the primary computer RE1 is connected (via the control line SL) to a first input $\bar{S}$ of the RS flip-flop FF, and the central processing unit CPU2 of the secondary computer RE2 is connected (via the ACKNOWLEDGEMENT line QL) to a second input $\bar{R}$ of this flip-flop. A noninverting output Q and an inverting output $\bar{Q}$ of the flip-flop FF are respectively connected to a first input 1 of the first OR gate OR1 and to a first input 5 of the second OR gate OR2. The central processing unit CPU2 of the secondary computer RE2 is also connected (via the control bus SB2) to a second input 2 of the first OR gate OR1 and to a second input 4 of the second OR gate OR2. An output 3 of the first OR gate OR1 is connected (via the control bus SB2) to the program memory MP2 of the secondary computer RE2. An output 6 of the second OR gate OR2 is coupled to the shared memory M.

The mass storage memory MSP of the primary computer RE1 contains an initial program loader to be loaded into the secondary computer RE2. The central processing unit CPU1 of the primary computer RE1 first loads this initial program loader into the shared memory M. It then controls the memory access logic circuit SZL via the control line SL such that, after the primary computer RE1 has applied a RESTART instruction over the control line SL to the reset input R of the central processing unit CPU2 of the secondary computer RE2, all program memory access instructions coming from the central processing unit CPU2, such as "PROGRAM READ", are routed to the portion of the shared memory M containing the initial program loader routine until the last instruction of the initial program loader routine has been read out by the secondary computer RE2.

This control of the memory access logic circuit SZL will now be explained in more detail with the aid of FIG. 2. Assuming that the circuit is implemented using "active low" logic, an L state is first applied to the first input $\bar{S}$ of the flip-flop FF over the control line SL, and an H state to the second input $\bar{R}$ over the ACKNOWLEDGEMENT line QL. As a result, an H state is applied from the noninverting output Q to the first input 1 of the first OR gage OR1, and an L state from the inverting output $\bar{Q}$ to the first input 5 of the second OR gate OR2. A memory access instruction coming from the central processing unit CPU2 of the secondary computer RE2, i.e., an L state at the control bus SB2 inputs 2, 4 of the two OR gates OR1, OR2, causes first OR gate OR1 to output an H state on its control bus SB2 output 3 leading to the program memory MP2 of the secondary computer RE2, and an L state to appear at the output 6 of the second OR gate OR2. Since the circuit works on the "active low" principle, the shared memory M, which is connected to the output 6, is thus activated.

It remains thus activated until the initial program loader has been loaded into the secondary computer RE2 and the central processing unit CPU2 of the secondary computer RE2, sends out an ACKNOWLEDGE signal over the ACKNOWLEDGEMENT line QL (L state at the second input $\bar{R}$ of the flip-flop FF) so that, since the primary computer RE1 is not activated (H state at the first input $\bar{S}$ of the flip-flop FF), all program memory access instructions from the secondary computer RE2 will thereafter be routed by the memory access logic circuit SZL to the program memory MP2. Thus, the central processing unit CPU2 of the secondary computer RE2 can access its program memory MP2, so that other programs stored in the mass memory MSP and made available via the shared memory M can be transferred into the central processing unit CPU2 and executed with the aid of the initial program loader.

It should thus be apparent that the above described process eliminates the need for the expensive and space-consuming bootstrap memories. Moreover, since the initial program loader is stored in a mass memory MSP and not in a read-only memory, the initial, program loader can be advantageously store in a way that facilitates any desired subsequent alterations and modifications.

In view of the fact that a few unused logic gates are usually available in an integrated circuit arrangement, the additional amount of circuitry required for the memory access logic circuit SZL is extremely small.

The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

While a preferred embodiment of this invention is shown above, it will be understood, of course, that the invention is not to be limited thereto It is contemplated, therefore, by the appended claims to cover any such modification as fall within the true spirit and scope of this invention.

What is claimed is:

1. Circuit apparatus for executing an initial program loader routine from a secondary computer connected via a shared random-access volatile memory to a primary computer, comprising:

first means for storing the initial program loader routine in the mass memory of the primary computer;

second means for copying the initial program loader routine from said mass memory into said volatile shared memory;

third means for sending a restart instruction from the primary computer to a central processing unit of the secondary computer after the initial program loader has been stored in said volatile shared memory;

fourth means, responsive to said restart instruction, for initially routing all program memory access instructions coming from the central processing unit of the secondary computer to the portion of the shared memory containing the initial program loader routine;

fifth means for sending an acknowledge signal from the central processing unit of the secondary computer when said central processing unit has read the last instruction of the initial program loader routine out of the shared memory;

a control bus linking the secondary computer central processing unit and the secondary computer program memory;

a control line connecting the primary computer to the secondary computer central processing unit for applying said restart instruction;

an acknowledgement line connected to the secondary computer central processing unit for providing said acknowledgement signal; and memory access logic circuit connected into the control bus at a point intermediate the central processing unit and the program memory, said memory access logic circuit further comprising a flip flop having a first input connected to said control line, a second input, a noninverting output and an inverting output, and first and second OR gates each having a pair of inputs and an output, the noninverting output and the inverting output of the flip-flop being respectively coupled to a first input of the first OR gate and to a first input of the second OR gate, the second inputs being connected to the portion of the control bus coming from the secondary computer central processing unit, the first OR gate being connected to the portion of the control bus leading to the program memory, and the output of the second OR gate being connected to the shared memory.

* * * * *